United States Patent
Berglöw et al.

(10) Patent No.: US 6,976,815 B2
(45) Date of Patent: Dec. 20, 2005

(54) MILLING CUTTER HAVING THREE CONTINUOUSLY CURVED CUTTING EDGES

(75) Inventors: Carl-Erik Berglöw, Fagersta (SE); Mattias Puide, Västerås (SE); Sven-Erik Persson, Söderbärke (SE); Kurt Nordlund, Fagersta (SE)

(73) Assignee: Seco Tools AB, Fagersta (SE)

( * ) Notice: Subject to any disclaimer, the term of this patent is extended or adjusted under 35 U.S.C. 154(b) by 67 days.

(21) Appl. No.: 10/770,513

(22) Filed: Feb. 4, 2004

(65) Prior Publication Data

US 2004/0223817 A1 Nov. 11, 2004

(30) Foreign Application Priority Data

Feb. 6, 2003 (SE) .............................................. 0300313

(51) Int. Cl.[7] .................................................. B23C 5/10
(52) U.S. Cl. ............................ 409/234; 407/54; 407/62; 408/226; 408/229
(58) Field of Search ................................. 409/232, 234; 407/53–54, 61–62, 56, 64–65, 30, 34, 42; 408/226–227, 229–231

(56) References Cited

U.S. PATENT DOCUMENTS

| 4,300,862 A | * | 11/1981 | Yada .............................. 407/53 |
| 4,850,759 A | | 7/1989 | Strand et al. |
| 5,303,787 A | | 4/1994 | Brady |
| 5,779,399 A | * | 7/1998 | Kuberski ...................... 407/54 |
| 5,964,555 A | | 10/1999 | Strand |
| 6,146,059 A | * | 11/2000 | Rohr ............................. 407/54 |
| 6,158,927 A | * | 12/2000 | Cole et al. .................... 407/64 |
| 6,488,450 B2 | * | 12/2002 | Norris .......................... 407/53 |
| 6,655,880 B2 | * | 12/2003 | MacArthur ................... 407/53 |
| 2003/0180104 A1 | * | 9/2003 | Kuroda et al. ................ 407/54 |
| 2003/0235479 A1 | * | 12/2003 | Chihara et al. .............. 409/132 |
| 2004/0258490 A1 | * | 12/2004 | Walrath ........................ 407/54 |
| 2005/0025584 A1 | * | 2/2005 | Kolker et al. ................. 407/54 |

FOREIGN PATENT DOCUMENTS

| DE | 20310713 U1 | * | 10/2003 |
| JP | 9-267211 | | 10/1997 |
| JP | 10-128611 | | 5/1998 |
| JP | 11-70405 | | 3/1999 |
| JP | 11-216609 | | 8/1999 |
| JP | 2001-1208 | | 1/2001 |
| JP | 2002-292515 | | 10/2002 |

* cited by examiner

*Primary Examiner*—Erica Cadugan
(74) *Attorney, Agent, or Firm*—Drinker Biddle & Reath LLP

(57) ABSTRACT

A milling cutter includes a body having three cutting edges formed by the body. An end of the body situated opposite the cutting edges defines a fastening end of the milling cutter. Each cutting edge extends from an outer periphery of the body substantially to a center rotational axis of the body along a substantially convexly curved path. Radially outer and radially inner ends of each cutting edge are situated axially rearwardly of an axially foremost point of the cutting edge. Each cutting edge lies on a respective imaginary sphere having a radius which has a center which that is spaced from the cutting edge in a direction toward the fastening end and spaced radially from the center axis.

12 Claims, 4 Drawing Sheets

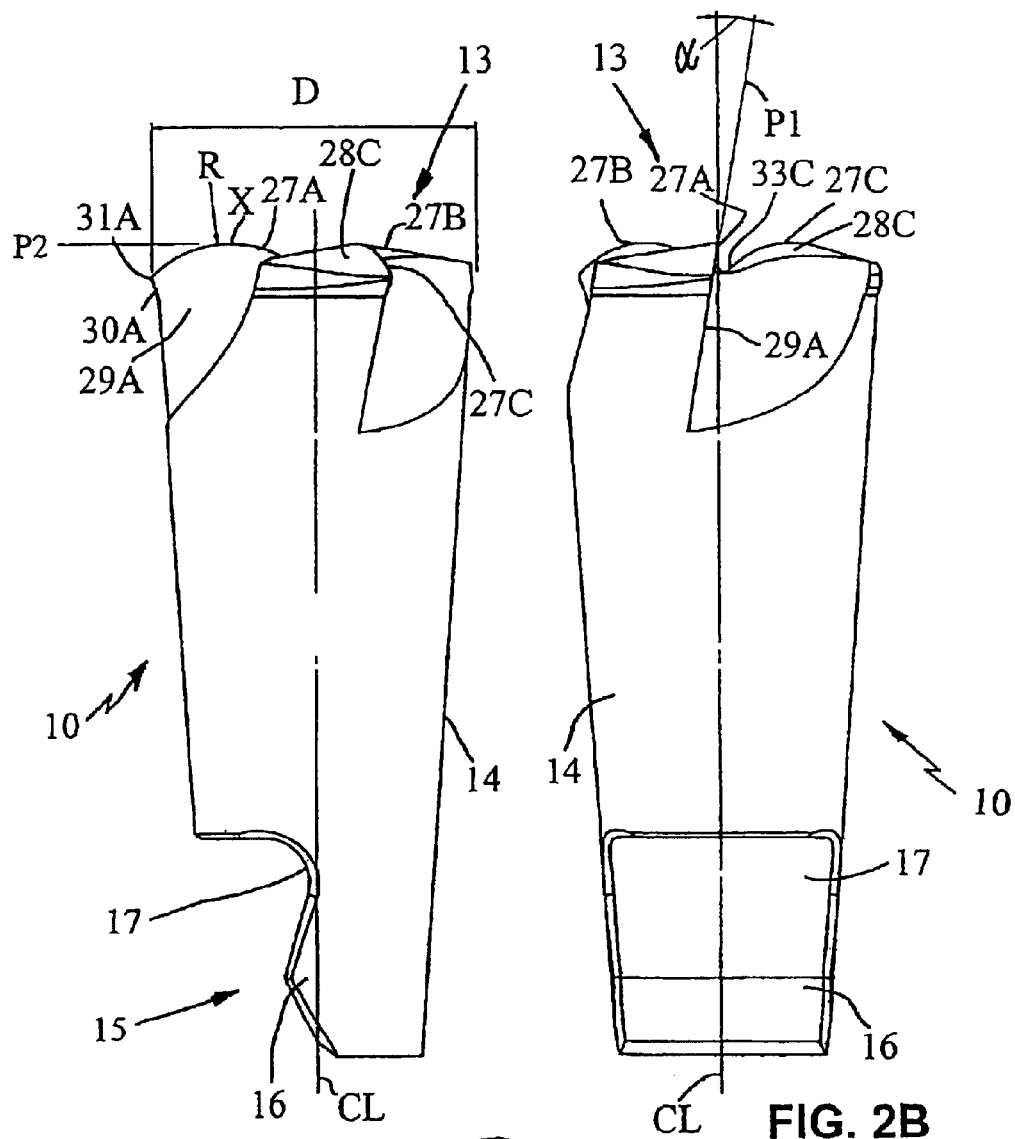
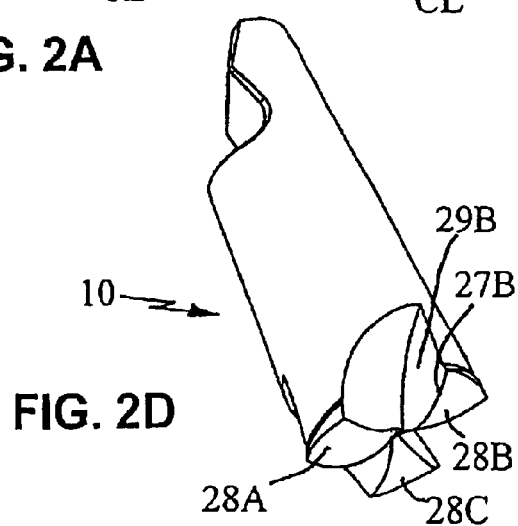
FIG. 2A
FIG. 2B
FIG. 2D

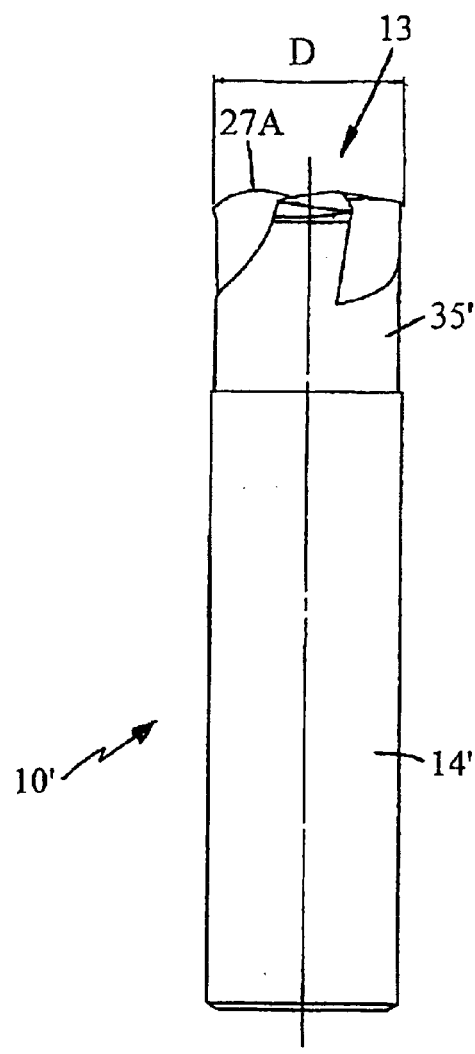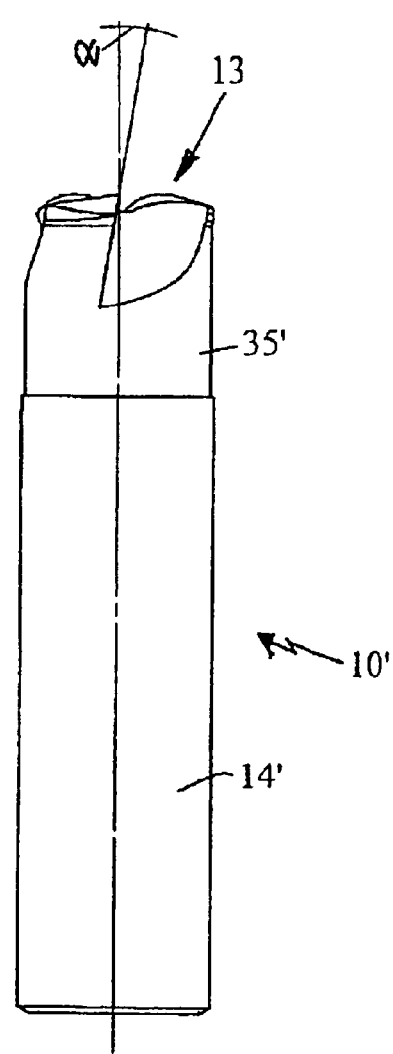
FIG. 3A  FIG. 3B
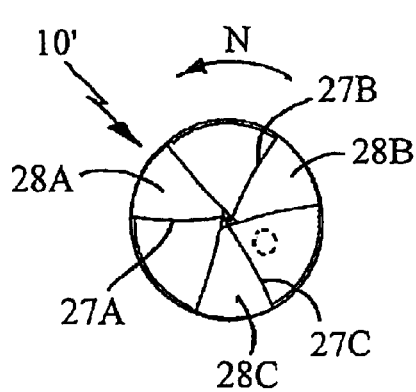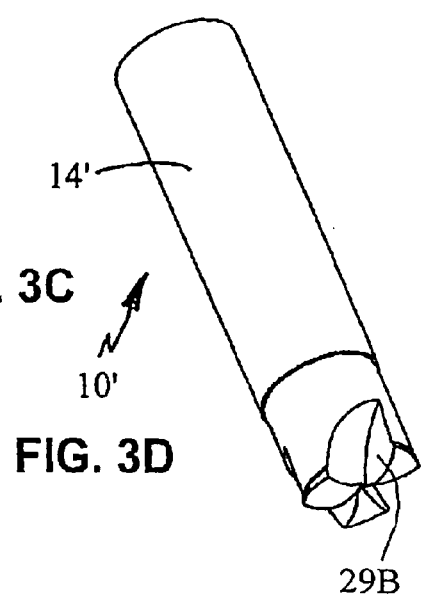
FIG. 3C  FIG. 3D

MILLING CUTTER HAVING THREE CONTINUOUSLY CURVED CUTTING EDGES

This application claims priority under 35 U.S.C. §§ 119 and/or 365 to patent application Ser. No. 0300313-4 filed in Sweden on Feb. 6, 2003, the entire content of which is hereby incorporated by reference.

BACKGROUND OF THE INVENTION

The present invention relates to a milling cutter for rotary cutting machining.

It is previously known by the applicant's U.S. Pat. No. 5,964,555 to provide a solution to the problem of making milling tools in small dimensions having replaceable cutting edges. However, it has turned out that during milling of, e.g., moulds in tool steel, that the cutting rate during face milling is not especially large. Furthermore, vibrations arise during use of the known tool.

Furthermore, it is known to provide shank-type cutters having screwed-in round cutting inserts in order to, among other things, be used during face milling. Since it most often concerns small dimensions, the hollow cutting inserts become relatively weak, which has manifested itself in tool breakdowns.

OBJECTS OF THE INVENTION

An object of the present invention is to provide a milling cutter, which solves the above-mentioned problems.

Another object of the present invention is to provide a milling cutter, which combines the advantages achieved by using round inserts with good strength.

Still another object of the present invention is to provide a milling cutter, which cuts softly and relatively vibration-free in the workpiece.

Still another object of the present invention is to provide a milling cutter, which enables face milling with high cutting rate.

SUMMARY OF THE INVENTION

The present invention relates to a milling cutter which comprises a body having three cutting edges formed by the body, and a fastening end. Each cutting edge being continuously curved from an outer periphery of the body substantially to a center rotational axis of the body along a substantially convexly curved path. Radially outer and radially inner ends of each cutting edge lying on a respective imaginary sphere having are situated axially rearwardly of an axially foremost point of the cutting edge. Each cutting edge lies substantially on a respective imaginary sphere having a center which is spaced from the cutting edge in a direction toward the fastening end and is spaced radially from the center axis.

BRIEF DESCRIPTION OF THE DRAWINGS

Below, embodiments of the invention will be described, reference being made to the appended drawings, where

FIGS. 2A and 2B show side views of an embodiment of a milling cutter according to the present invention;

FIG. 2D shows the milling cutter in perspective view;

FIGS. 3A and 3B show side views of an alternative embodiment of a milling cutter according to the present invention, in more detail;

FIG. 3C shows the milling cutter in an end view; and

FIG. 3D shows the milling cutter in a perspective view.

DETAILED DESCRIPTION OF PREFERRED EMBODIMENTS OF THE INVENTION

Figure 1:
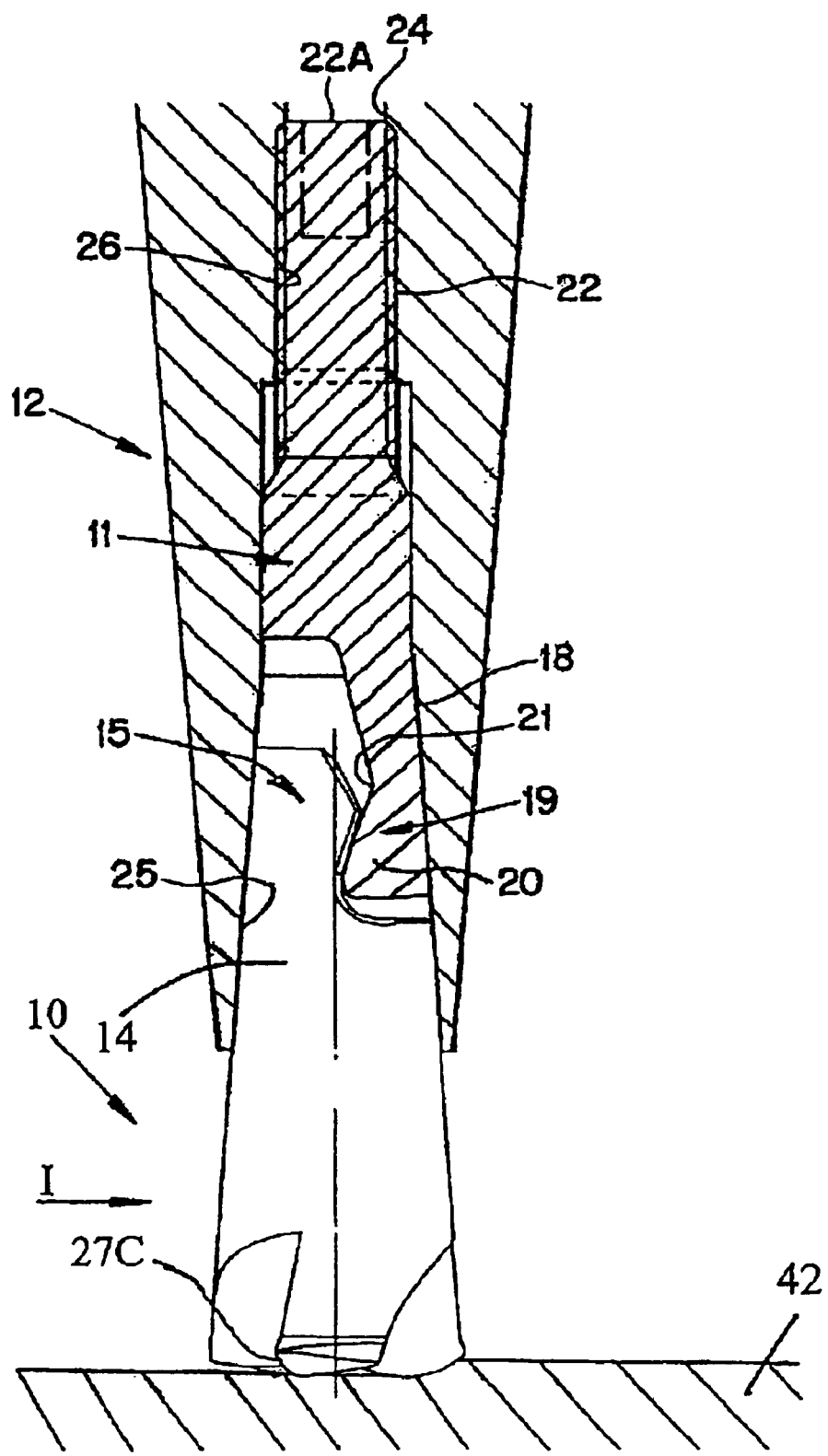
FIG. 1 shows an embodiment of a tool according to the present invention in an assembled state, patly in cross-section, in engagement with a workpiece.

The embodiment of a tool shown in FIG. 1 comprises a milling cutter 10 according to the present invention, a locking screw 11 as well as a holder 12. The tool comprises hook-shaped couplers 15, 19 arranged on the milling cutter and the locking screw, respectively. The coupler 15 defines a fastening end of the cutter.

The milling cutter 10 is, at the end thereof facing away from the holder 12, provided with a cutting end 13 provided with three cutting edges. A preferred form of the milling cutter 10 is shown more in detail in FIGS. 2A–2E. The milling cutter 10 is manufactured from hard material, preferably cemented carbide, and comprises a body having three integrated cutting edges 27A, 27B and 27C, i.e., the cutting edges are defined by the body itself as opposed to being defined by a separately attached insert. The most common hard material in cemented carbide is tungsten carbide, TC. Many cemented carbide sorts contain only TC and binder metal. In others, carbides of the metals titanium (TiC), tantalum (TaC) and niobium (NbC) are furthermore included. The most common binder metal is cobalt, Co, but also nickel, Ni, is found. The cemented carbide is a powder mixture built up by carbide particles having a grain size of 0.5–10 μm and a binder metal, generally cobalt. The percentage by volume of the binder metal is 5–40% and of the carbides 95–60%.

Each cutting edge 27A, 27B and 27C is continuously convexly curved as viewed in the axial direction (FIG. 2C), and is formed along the intersecting line between a clearance surface 28A, 28B and 28C and a chip surface 29A, 29B and 29C. The cutting edges are evenly spaced, i.e. each cutting edge forms 120° with the adjacent cutting edge. Each cutting edge lies on a respective imaginary sphere defined by a radius R, the center C of which is spaced from the cutting edge towards the fastening end 15 of the milling cutter and spaced from the center line (or the rotational axis CL) by a distance Y in the radial direction.

Figure 2C:
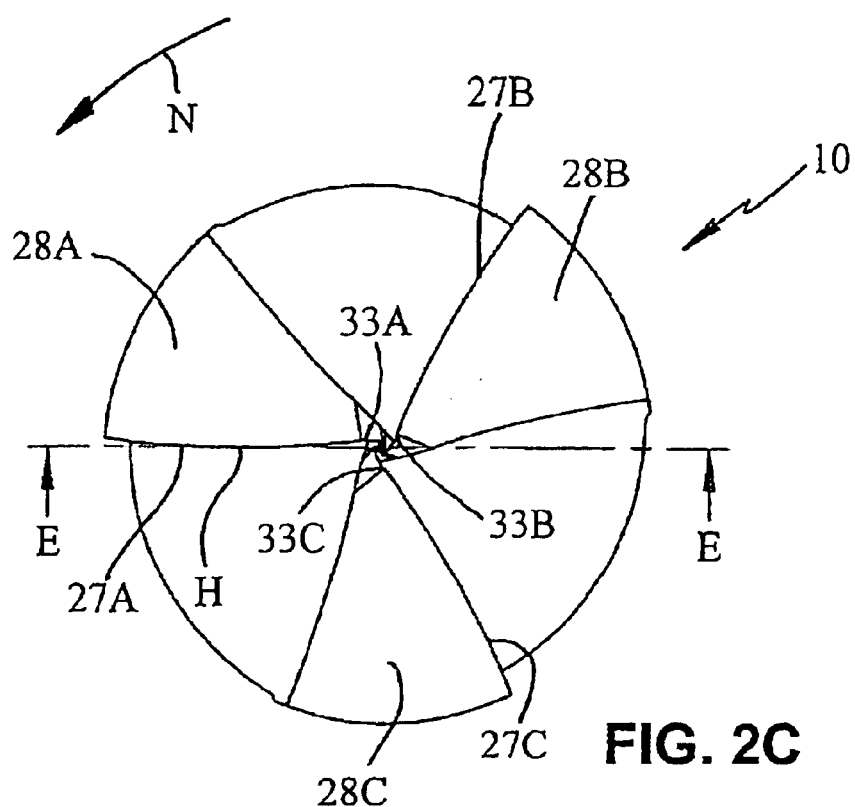
FIG. 2C shows the milling cutter in an end view.
Figure 2E:
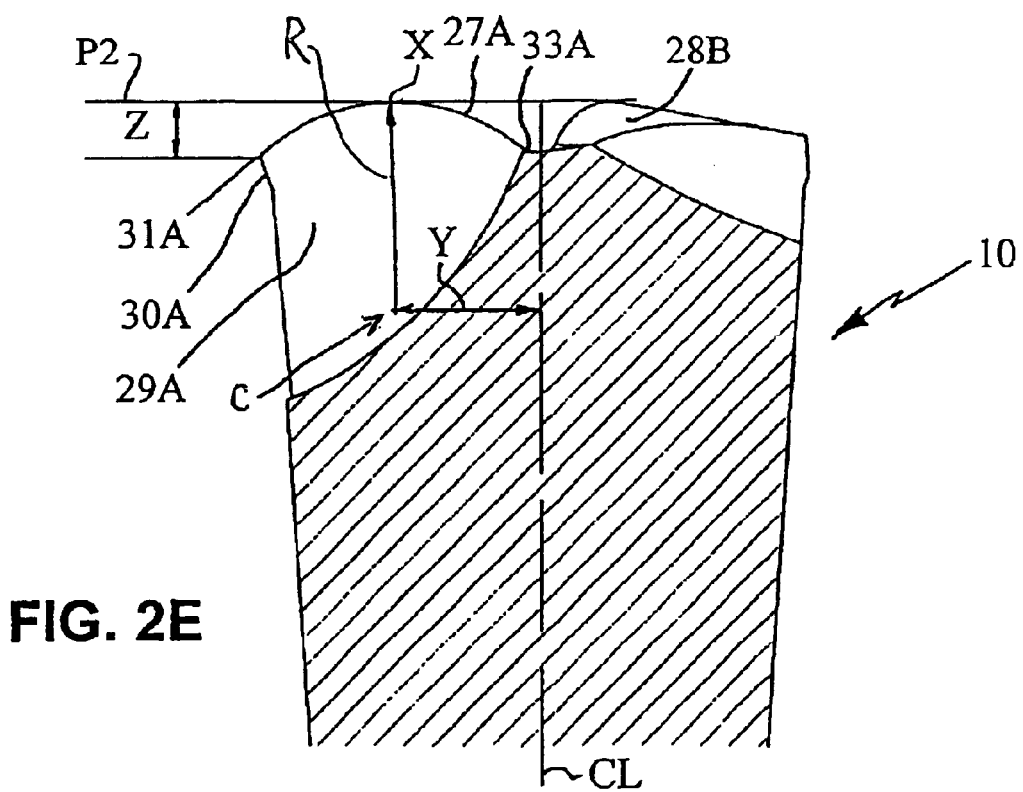
FIG. 2E shows a part of the milling cutter in cross-section according to the line E—E in FIG. 2C.

The direction of tool rotation N is shown in FIG. 2C. Each center C preferably lies in the plane P1 of the respective chip surface 29A, 29B and 29C. The cutting edge has an axially foremost point X, which in the preferred embodiment is arranged at substantially the same radial distance Y from the center line CL as the radius center C. The radially outer ends 31A, 31B, 31C as well as the radially inner ends 33A, 33B, 33C of the cutting edges are arranged axially behind the maximum point X, i.e., in the direction of the holder or the fastening end of the milling cutter. The radius R is of the same order of size as half of the maximum outer diameter D of the milling cutter body, most preferably R is in the interval 1–10 mm. Furthermore, each cutting edge 27A, 27B and 27C is convexly curved in the tangential direction, i.e., convex in the direction of rotation N, as is seen in the end view according to FIG. 2C so that it comprises a tangentially foremost point H at approximately the radial middle of the cutting edge.

The radially outer end of each cutting edge connects to an associated straight edge 30A, 30B, 30C via a corner or end 31A, 31B, 31C having a radius of maximally 1 mm. The straight edge is not intended to cut. The end 31A, 31B, 31C is arranged at an axial distance Z from a plane P2 that intersects the maximum points X on the cutting edges and that is normal to the axis CL. The distance Z defines the greatest cutting depth of the milling cutter. The distance Z is 10–15% of the greatest outer diameter D of the milling cutter body. After the end 31A, 31B, 31C in the direction of rotation N, the cutter body generally approaches the center line CL in order to obtain clearance. The radially outermost points 31A, 31B, 31C of the cutting edges lie in a common, imaginary circle concentric with the center line CL of the milling cutter and of the tool, said circle constituting the greatest outer diameter of the milling cutter body. The edges 30A, 30B, 30C are arranged along an imaginary, truncated cone, the tip of which is facing the fastening end 15. The cone lies radially outside an imaginary extension of the envelope surface of the milling cutter 10. Said cone has a larger cone angle than the cone angle for the envelope surface of the milling cutter 10. Alternatively, the edges 30A, 30B, 30C could be convex or concave, instead of straight.

Each cutting edge 27A–27C could be shaped as a segment of a circle, or it may alternatively be continuously curved in another way so that it follows an elliptical, parabolic or similar path, as viewed along the axis (FIG. 2C). That is, each cutting edge can assume any continuously curved shape on its respective imaginary sphere. An essential aspect is that the curvature is continuous in order to obtain a fine surface finish of the machined surface on the metal workpiece during chip removing machining. An example of maximum cutting depth Z is 1.9 mm for a diameter D of 16 mm. If the selected cutting depth for milling is larger than the distance Z, the milling cutter operator will notice this by the suddenly raised disadvantageous chip formation, which then takes place during a cutting operation.

Each chip surface 29A, 29B or 29C is substantially planarly formed and has an extension from the cutting edge substantially axially rearwards. Each chip surface forms a positive, acute angle ∝, of about 5–20° with the center line CL of the milling cutter. Each chip surface forms an acute edge angle of about 60 to 80°, with the respective clearance surface 28A, 28B and 28C. The clearance surface is arched or curved, as is the associated cutting edge. In the milling cutter example shown the diameter D is 16 mm while the axial length is 39 mm.

At the part thereof facing towards the holder 12, the milling cutter is provided with a first conical portion or shank 14, one end of which is provided with the hook-shaped coupler 15, which in the embodiment illustrated comprises a first shoulder 16 as well as a first recess 17. The locking screw 11, which preferably is manufactured from steel, has at its end facing towards the milling cutter, a second conical portion 18, which is provided with the second engagement means or coupler 19, that is intended to cooperate with the first coupler 15. The second coupler 19 comprises a second shoulder 20 as well as a second recess 21. In the active position, the first shoulder 16 cooperates with the second recess 21, and the second shoulder 20 cooperates with the first recess 17. Axially inside the second coupler 19, in the axial direction, the locking screw 11 has an externally threaded, preferably cylindrical portion 22. A hex socket wrench handle may be arranged at the axially rear end 22A of the locking screw 11, whereby loosening or tightening of the locking screw 11 is made possible by the interior duct 24 of the holder 12. Alternatively, the thread 26 may be arranged in an end of a releasable sleeve, the second end of which then is provided with an external thread as well as a key recess.

The holder 12 is, at the end thereof facing towards the milling cutter 10, provided with a conical seat 25, which houses the first and second conical portions 14 and 18 of the milling cutter 10 and the locking screw 11 respectively. Inside the conical seat 25, the holder 12 has a substantially cylindrical, internally threaded portion 26, which co-operates with the externally threaded portion 22 on the locking screw 11.

Assembly and disassembly of the tool is disclosed in more detail in U.S. Pat. No. 4,850,759, which hereby is incorporated herein by reference. Cooperation between the external thread 22 and the internal thread 26 entails that the locking screw 11 and thereby also the milling cutter 10 are displaced axially into the holder 12 until the cone-shaped portion 14 comes to abutment against the conical seat 25, i.e., the position according to FIG. 1 has been attained. The milling cutter 10 is now in a satisfactory way anchored in the holder 12.

The threads 22 and 26 are made as right-hand threads for right-hand cutting tools, and as left-hand threads for left-hand cutting tool.

The above-described embodiment relates to milling cutters, i.e., tools that rotate around the longitudinal center line thereof. Milling cutters having small cutting tips are the dominant the field of application for the present invention.

From FIG. 1 it is seen that when the milling tool face mills a surface on the workpiece 42, the tool is brought during rotation and great feed in the direction of the arrow I in order to produce a planar surface having a good surface finish.

FIGS. 3A–3D show an alternative embodiment of a shank-type cutter 10' according to the present invention. The cutting end 13 of the shank-type cutter is substantially identical to that shown above in connection with the milling cutter 10. Therefore, the same reference numerals are used for the same features. What separates this shank-type cutter from the above-shown milling cutter is the design of the fastening means or shank 14'. The shank 14' is cylindrical in order to fit into a conventional spindle in a milling machine, not shown. Thus, the corners 31A–31C protrude in relation to a cylindrical first portion 35' of the body having a cylindrical envelope surface, but coincide preferably with a cylindrical extension of the envelope surface of the shank 14'. In the example shown, the diameter D is 16 mm while the axial length of the milling cutter is 66 mm and each corner protrudes 0.3 mm in relation to the envelope surface of the first portion 35'.

Thus, the milling cutter according to the present invention combines the advantages of round cutting inserts with good strength, and cuts softly and relatively vibration-free in the workpiece at a relatively high cutting rate.

The milling cutter according to the present invention is preferably at least partly coated with layers of, e.g., $Al_2O_3$, TiN and/or TiCN. In certain cases, it may be justified with soldered superhard materials such as CBN or PCD on the cutting edges.

The invention is in no way limited to the above-described embodiments. For instance, from one to three flush ducts may be arranged in the milling cutter. For instance, a flush duct may run centrally through the milling cutter, said flush duct extending from the fastening end and through the milling cutter in the direction of the cutting end. There, three eccentric sub-ducts connect, one of which is illustrated by a dashed circle in FIG. 3C, for transportation of flushing medium to the respective cutting edge. All ducts then mouth at the same distance from the center line CL. Furthermore, other shank forms may be used.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A milling cutter comprising a body having three cutting edges formed by the body, and a fastening end, each cutting edge being continuously curved from an outer periphery of the body substantially to a center rotational axis of the body along a substantially convexly curved path, wherein radially outer and radially inner ends of each cutting edge being situated axially rearwardly of an axially foremost point of the cutting edge, each cutting edge lying substantially on a respective imaginary sphere having a center spaced from the cutting edge in a direction toward the fastening end and spaced radially from the center axis;

each cutting edge defined by an intersection of a clearance surface and a chip surface of the body, each clearance surface being convexly arch-shaped and having two radially-extending clearance edges that continuously converge towards one another as they extend from the outer periphery substantially to the axis as viewed along the axis.

2. The milling cutter according to claim 1 wherein a radially outer end of each cutting edge is spaced axially by a distance from a plane containing the axially foremost points of all of the cutting edges.

3. The milling cutter according to claim 2 wherein the distance is 10–15% of a largest outer diameter of the body.

4. The milling cutter according to claim 1 wherein the radius of each imaginary sphere is about one-half of a largest outer diameter of the body.

5. The milling cutter according to claim 1 wherein a radial distance from the axis to the axially foremost point of each cutting edge is substantially equal to a radial distance from the axis to the center of each imaginary sphere.

6. The milling cutter according to claim 1 where the body comprises cemented carbide.

7. The milling cutter according to claim 1 wherein the cutting edges are evenly spaced apart about the axis.

8. The milling cutter according to claim 1 wherein the body includes a conical shank forming a hook, the hook defining the fastening end.

9. The milling cutter according to claim 1 wherein the body includes a conical shank disposed axially rearwardly of the cutting edges.

10. The milling cutter according to claim 1 wherein the radially outer ends of the cutting edges lie in an imaginary cylindrical extension of an envelope surface of the shank, and lie radially outside of a cylindrical portion of the body interconnecting the shank with the cutting edges.

11. The milling cutter according to claim 10 wherein each cutting edge is shaped as a segment of a circle as viewed in the direction along the axis.

12. The milling cutter according to claim 1 wherein each cutting edge is convexly curved in the direction of rotation of the body as viewed in a direction along the axis.

* * * * *